US011276223B2

(12) United States Patent
Saleh et al.

(10) Patent No.: US 11,276,223 B2
(45) Date of Patent: Mar. 15, 2022

(54) MERGED DATA PATH FOR TRIANGLE AND BOX INTERSECTION TEST IN RAY TRACING

(71) Applicant: Advanced Micro Devices, Inc., Santa Clara, CA (US)

(72) Inventors: Skyler Jonathon Saleh, La Jolla, CA (US); Jian Mao, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/219,802

(22) Filed: Dec. 13, 2018

(65) Prior Publication Data

US 2020/0193682 A1 Jun. 18, 2020

(51) Int. Cl.
*G06F 9/30* (2018.01)
*G06T 15/00* (2011.01)
*G06T 15/06* (2011.01)

(52) U.S. Cl.
CPC .......... *G06T 15/06* (2013.01); *G06F 9/30087* (2013.01); *G06T 15/005* (2013.01)

(58) Field of Classification Search
None
See application file for complete search history.

(56) References Cited

U.S. PATENT DOCUMENTS 6,049,860 A * 4/2000 Krygowski ........... G06F 9/3824
712/25
7,809,932 B1 10/2010 Barry et al.
8,612,726 B2 12/2013 Mohammad et al.
9,588,770 B2 3/2017 Burgess et al.
10,033,542 B2 7/2018 Jin et al.
(Continued)

FOREIGN PATENT DOCUMENTS

KR 10-2014-0113307 A 9/2014
KR 10-2018-0030886 A 3/2018

OTHER PUBLICATIONS

Stich, M., "Introduction to NVIDIA RTX and DirectX Ray Tracing," NVIDIA Developer Blog, https://devblogs.nvidia.com/introduction-nvidia-rtx-directx-ray-tracing/, Mar. 19, 2018 (Retrieved Dec. 13, 2018).

(Continued)

*Primary Examiner* — Kyle Zhai
(74) *Attorney, Agent, or Firm* — Volpe Koenig

(57) ABSTRACT

Described herein is a merged data path unit that has elements that are configurable to switch between different instruction types. The merged data path unit is a pipelined unit that has multiple stages. Between different stages lie multiplexor layers that are configurable to route data from functional blocks of a prior stage to a subsequent stage. The manner in which the multiplexor layers are configured for a particular stage is based on the instruction type executed at that stage. In some implementations, the functional blocks in different stages are also configurable by the control unit to change the operations performed. Further, in some implementations, the control unit has sideband storage that stores data that "skips stages." An example of a merged data path used for performing a ray-triangle intersection test and a ray-box intersection test is also described herein.

20 Claims, 5 Drawing Sheets

(56) References Cited

U.S. PATENT DOCUMENTS

| | | | |
|---|---|---|---|
| 2005/0149699 A1* | 7/2005 | Norden | G06F 9/3824 |
| | | | 712/219 |
| 2014/0289690 A1* | 9/2014 | Chopra | G06F 30/394 |
| | | | 716/113 |
| 2015/0089156 A1* | 3/2015 | Clohset | G06T 15/005 |
| | | | 711/141 |
| 2018/0113714 A1 | 4/2018 | Chen et al. | |

OTHER PUBLICATIONS

Owen, G. Scott, "Ray-Box Intersection", https://www.siggraph.org//education/materials/HyperGraph/raytrace/Hinter3.htm, Apr. 1, 1998 (Retrieved Dec. 13, 2018).

* cited by examiner

MERGED DATA PATH FOR TRIANGLE AND BOX INTERSECTION TEST IN RAY TRACING

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein is a merged data path unit that has elements that are configurable to switch between different instruction types. The merged data path unit is a pipelined unit that has multiple stages. Between different stages lie multiplexor layers that are configurable, by a control unit, to route data from functional blocks of a stage that is prior to the multiplexor layer to a stage that is subsequent to the multiplexor layer. The manner in which the multiplexor layers are configured for a particular stage is based on the instruction type executed at that stage. In some implementations, the functional blocks in different stages are also configurable by the control unit to change the operations performed. (For example, a combined multiplier/adder can be set as a multiplier or an adder based on the instruction type). Further, in some implementations, the control unit has sideband storage that stores data that "skips stages." An example of a merged data path used for performing a ray-triangle intersection test and a ray-box intersection test is described herein. Additional details are provided below.

Figure 1:
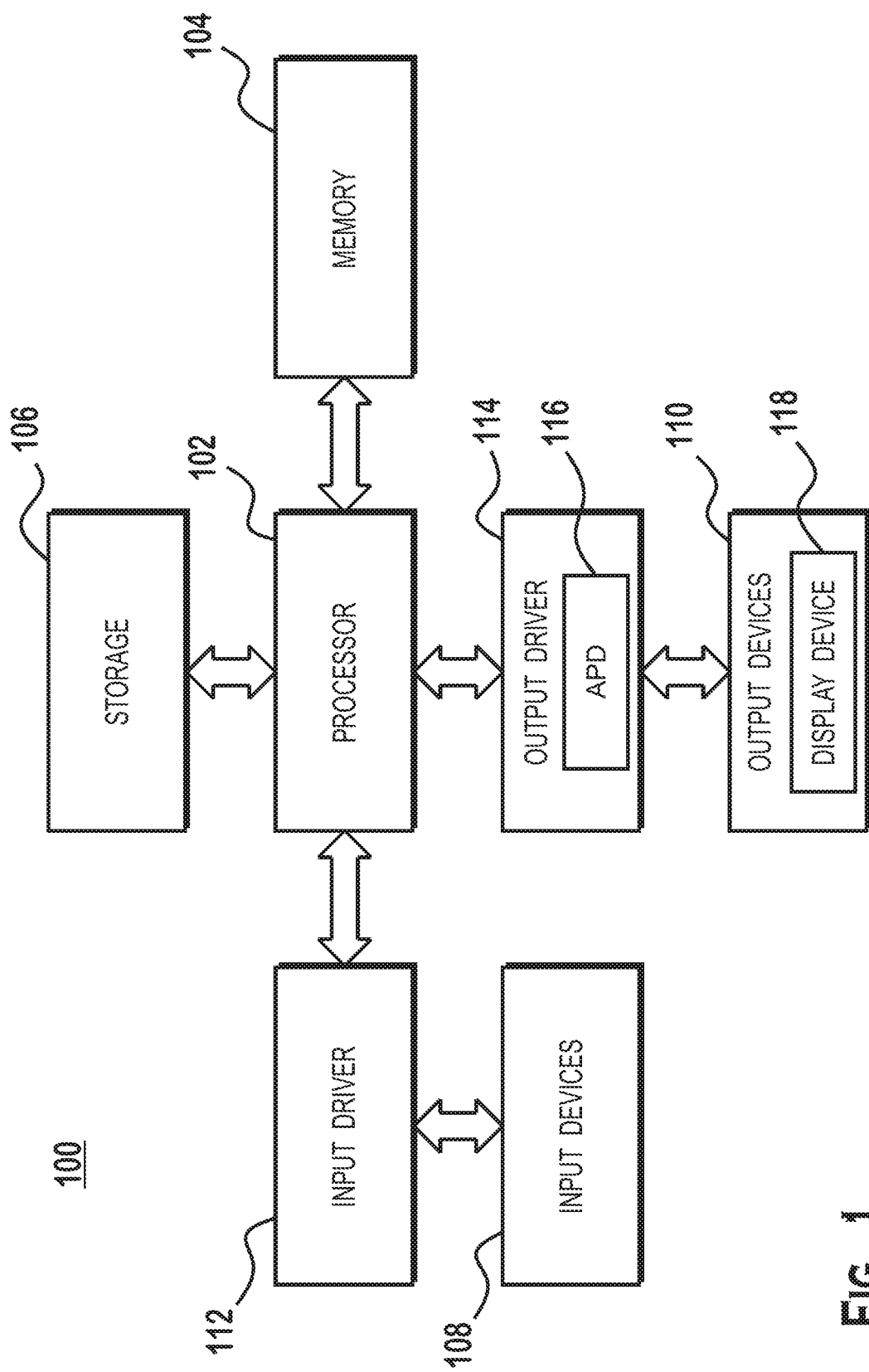
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
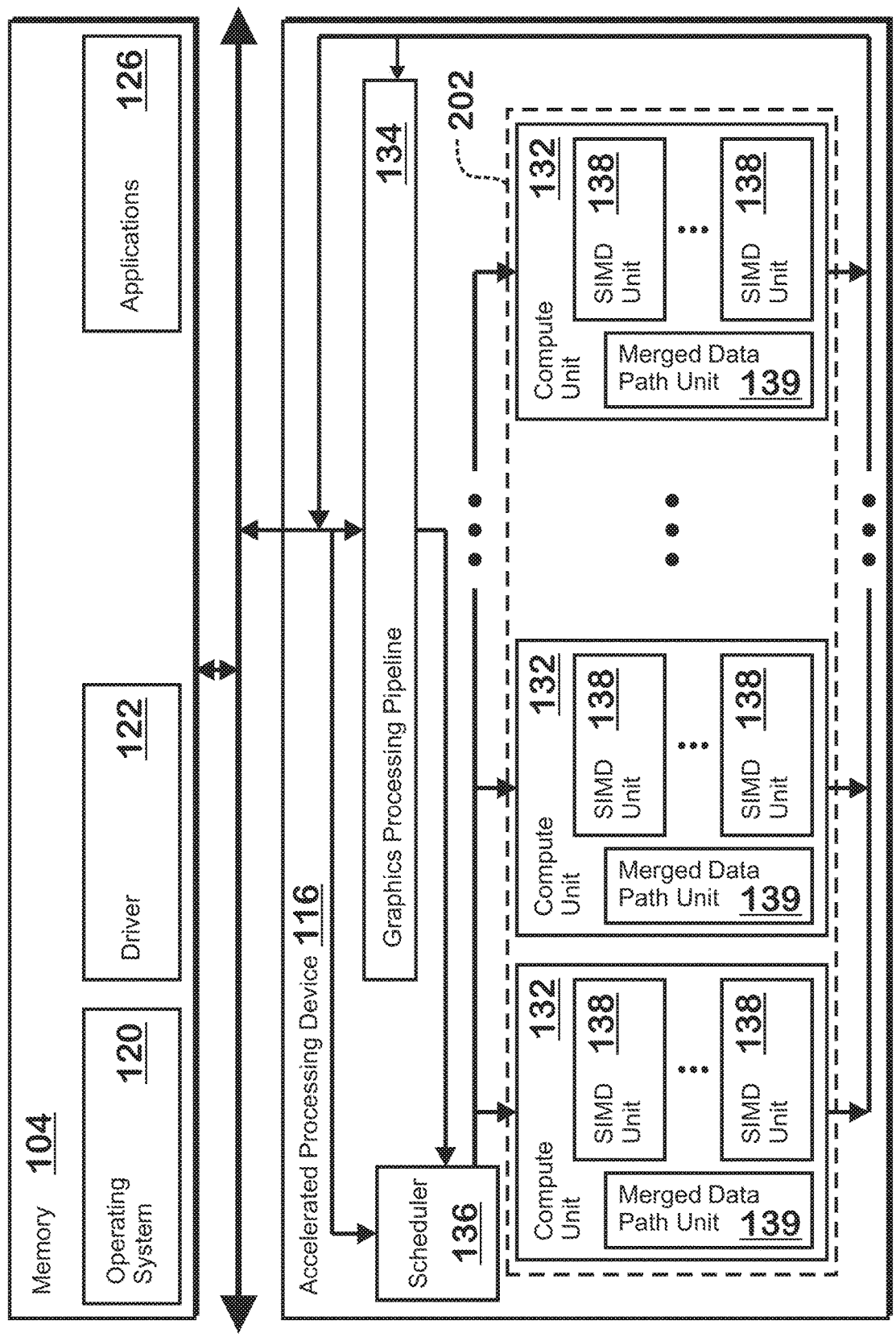
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Each compute unit 132 includes one or more merged data path units 139. A merged data path unit 139 is a unit that has functional blocks that are shared between different operations. In an example, a merged data path unit 139 performs both ray-to-box and ray-to-triangle hit detection for ray casting shader programs executed in the SIMD units 138. Functional blocks within the merged data path unit 139 include blocks such as individual adders and multipliers. In the merged data path unit 139, some of these functional blocks are used for two or more of the different operations. Note that although the merged data path unit 139 is described as being included in an APD 116, it should be understood that the merged data path unit 139 could be used in or in conjunction with any type of processing unit. In an example, programs executing in a SIMD unit 138 request the merged data path unit 139 perform specific instructions, and in response, the merged data path unit 139 configures itself according to the instruction types requested and performs the requested instructions.

Figure 3:
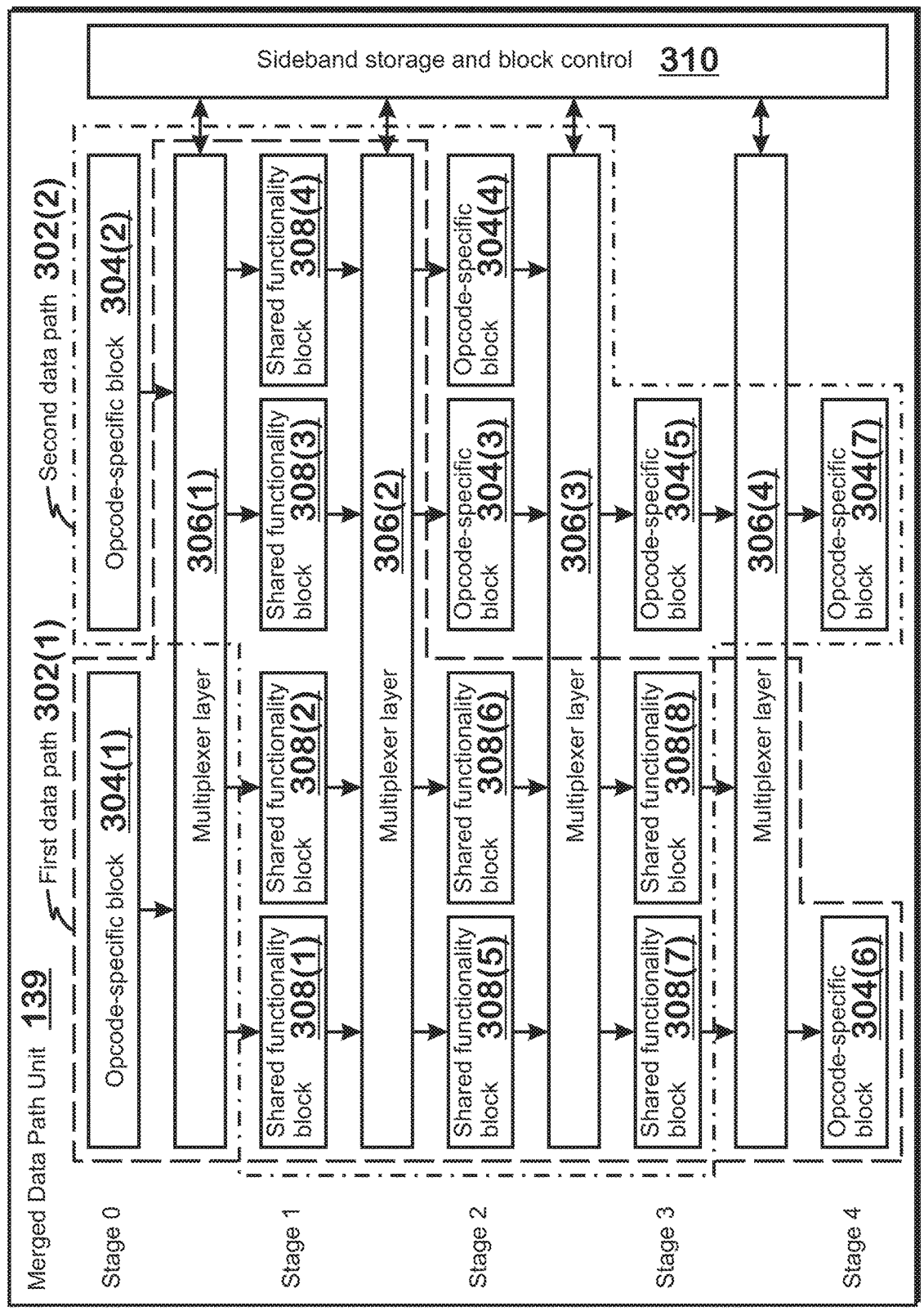
FIG. 3 illustrates details of a merged data path unit, according to an example.

FIG. 3 illustrates details of a merged data path unit 139, according to an example. The merged data path unit 139 includes a number of opcode specific blocks 304, multiplexer layers 306, and shared functionality blocks 308 arranged in stages, as well as a sideband storage and block control unit 310 (also referred to herein as the "control unit 310"). The merged data path unit 139 is considered "merged" because different types of instructions can be executed in the merged data path unit 139 using at least some of the same functional blocks ("shared functionality blocks 308").

The term "functional blocks" refers both to the opcode-specific blocks 304 and the shared functionality blocks 308. An opcode-specific block 304 is a functional block (i.e., a circuit that performs specific operations such as additions or multiplications, determining minimums or maximums, performing logical operations such as AND operations and/or OR operations, or performing specific sequences of the above) that is used only by a specific data path 302 (and thus only a specific instruction type, defined by its opcode). A shared functionality block 308 is a functional block that is used by two or more data paths 302 (and thus two or more instruction types). In some implementations, shared functional blocks 308 perform a fixed operation (such as an addition) regardless of what instruction type is being executed by that functional block. In other implementations, the control unit 310 is able to configure shared functional blocks 308 to perform different operations for different instruction types.

The beginning and end of any functional block is defined by clocked elements (such as flip-flops). Signals propagate from a flip flop at the input of the functional block through the logic of the functional block, without encountering any clocked elements until the output of the functional block, to provide a result at the output of that functional block. At the output, the results are stored in the output flip flops for use in subsequent stages. Typically, the propagation delay of each functional block is lower than the cycle period multiplied by the number of stages across which the functional block spans. (Usually this number is one, but it is possible for some functional blocks to span multiple stages, where the propagation delay across that functional block is greater than the cycle period but is less than a specific multiple of the cycle period).

The multiplexer layers 306 include one or more multiplexors that accept data from an immediately previous stage or the control unit 310 and provide data to an immediately subsequent stage or the control unit 310, based on control signals set by the control unit 310.

At the input of the merged data path unit 139, the merged data path unit 139 accepts an opcode specifying an instruction type and one or more operands for that instruction type. The instructions are processed through a sequence of stages to produce and output one or more results. Because the merged data path unit 139 is pipelined, in any particular cycle, each stage executes sub-operations for a different instruction.

The control unit 310 configures each stage to perform sub-operations for a specific instruction type based on which instruction type is to be executed by that stage in any given cycle. More specifically, in each clock cycle, each stage performs sub-operations for a specific instruction type. The term "sub-operations" means any intermediate calculations or operations for an instruction type that are performed by a particular functional block of the merged data path unit 138. In an example, for an instruction that involves a sequence of multiply-add operations one sub-operation is addition of two values, another sub-operation is a multiplication of two values, yet another sub-operation is an addition of two values, and so on. The particular sequence of sub-operations to be performed for any given instruction depends on the opcode of that instruction.

The control unit 310 controls the multiplexer layers 306 based on the opcode of the instruction, to route data for particular instructions to particular functional blocks. In addition, the control unit 310 acts as temporary storage for instructions that do not perform any operations in a particular stage. This storing can occur, for example, if a particular instruction type is at least partially serialized through the merged data path unit 139, as described in greater detail below.

For any given stage, in any particular cycle, the functional blocks of that stage are configured to perform sub-operations for a single instruction type. However, the stages are able to change which instruction type is being performed at that stage on every cycle. Thus in any particular cycle, it is possible for one stage to be configured to perform an instruction of a first type while in that same cycle, an immediately subsequent (or immediately preceding) stage is performing an instruction of a second type.

One purpose of using a merged data path unit 139 is to reduce the amount of silicon area that is used by only a single type of instruction, because doing so reduces the total amount of silicon for a chip. Thus one way to design a merged data path unit is to design the merged data path unit for the instruction that requires the largest amount of silicon area and then to use the functional blocks occupying that silicon area for other instruction types that require less silicon. The functional blocks that are used by more than one instruction are the shared functionality blocks 308 described above. It is of course possible that different instruction types require either unique functional units that cannot be shared with different instruction types or require more of a particular shared functionality block 308 than other instruction types.

It is possible to take advantage of a difference in silicon area amount needed for different instruction types, by increasing the throughput for the instruction type that needs less silicon. Increased throughput for a first instruction type as compared with a second instruction type means that more instructions of the first instruction type are processed through the merged data path unit 139 than for the second instruction type in the same number of cycles. Increased throughput can be achieved through either or both of parallelizing sub-operations for an instruction type in a particular stage or serializing sub-operations for the instruction type across multiple stages. Parallelizing sub-operations for an instruction type means using functional blocks to perform sub-operations corresponding to multiple instances of a given instruction type in a single stage. Serializing sub-operations means performing the same sub-operation for different instruction instances of the same type in different stages of the merged data path unit 139. Parallelizing sub-operations may be performed when a large number of functional blocks already exist in a particular stage due to being necessary for an instruction requiring a larger amount of silicon than the instruction that is parallelized. In that situation, sub-operations for multiple instances of an instruction requiring a smaller amount of silicon could be performed in that particular stage in the same cycle. By one or both of parallelizing and serializing the lower-silicon instructions, a high percent of the large amount of silicon used for higher-silicon instructions is used for the lower-silicon instructions.

An example of the above features of the merged data path unit 139 is illustrated in FIG. 3. A first data path 302(1) handles instructions of a first type and a second data path 302(2) handles instructions of a second type. The first type requires more silicon area than the second type. Specifically, each instruction of the first type requires the following units: the op-code specific block 304(1), four shared functionality blocks 308(1)-308(4) in stage 1, two shared functionality blocks 308(5)-308(6) in stage 2, two shared functionality blocks 308(7)-308(8) in stage 3, and an opcode-specific block 304(6) in stage 4. The opcode-specific block 304(1) is also used for each instruction of the first type. Each instruction of the second type requires the following units: two shared functionality blocks 308, and one opcode-specific block 304. The opcode-specific block 304(2) is shared between multiple instances of the second type of instruction. The instructions of the second type use opcode specific blocks 304(3), 304(4), 304(5), and 304(7), but not 304(6). Note that each instruction of the first instruction type requires eight shared functionality blocks 308 while each instruction of the second instruction type only requires two shared functionality blocks 308. Thus there are enough shared functionality blocks 308 to output results for one instruction of the first type per cycle or to output results for four instructions of the second type per cycle.

Operation of the merged data path unit 139 occurs for the first instruction type in the following manner. Data for an instruction of the first instruction type is input to opcode-specific block 304(1) in stage 0 in a first cycle. In addition, the opcode of the instruction is supplied to the sideband storage and block control unit 310 (again, sometimes shortened to "control unit 310"). The opcode-specific block 304(2) is not used during this cycle because that block is for instructions of the second type. The result of the opcode-specific block 304(1) is output to the multiplexer layer 306(1).

In the next cycle, the control unit 310 configures the multiplexer layer 306(1) to distribute values from the opcode-specific block 304(1) to each of the shared functionality blocks 308 in stage 1, all of which are used to process a single instruction of the first type. The shared functionality blocks 308 of stage 1 process the values and output results to multiplexer layer 306(2). The control unit 310 configures multiplexer layer 306(2) to output the values to one of shared functionality blocks 308(5) or shared functionality block 308(6). Those blocks process the data and output results to the multiplexer layer 306(3). The control unit 310 configures multiplexer layer 306(3) to output the results to one of shared functionality block 308(7) or shared functionality block 308(8). Those blocks process the results and output results to multiplexer layer 306(4). The control unit 310 controls the multiplexer layer 306(4) to output the results to the opcode-specific block 304(6), which processes the results and outputs a result for the instruction.

Processing instructions of the second type occurs in the following manner. Values for four different instructions of the second type are input to the opcode-specific block 304(2). The opcode-specific block 304(2) processes those results and outputs those values to the multiplexer layer 306(1). The control unit 310 configures the multiplexer layer 306(1) to output values for two instructions to shared functionality blocks 308(1) to 308(4) and to output values for the other two instructions to the control block 310 for temporary storage. Shared functionality blocks 308(1) and 308(2) process values for the first instruction and output those values to the multiplexer layer 306(2). Shared functionality blocks 308(3) and 308(4) process values for the second instruction and output those values to the multiplexer layer 306(2). The control unit 310 configures the multiplexer layer 306(2) to provide values for the third instruction, which were stored in the control unit 310 and were not processed in stage 1, to stage 2 for the same sub-operations as were performed on the first and second instructions in stage 1. The control unit 310 configures the multiplexer layer 306(2) to provide the values output from stage 1 for instruction 1 to the first opcode specific block 304(3) in stage 2 and configures the multiplexer layer 306(2) to provide the values output from stage 1 for instruction 2 to the second opcode specific block 304(4) in stage 2. The blocks of stage 2 process the values and output results to the multiplexer layer 306(3). The control unit 310 configures the multiplexer layer 306(3) to provide the outputs of the shared functionality blocks 308 of stage 2 to the opcode-specific block 304(5) of stage 3, to provide the outputs for instruction 4 to the shared functionality blocks 308 of stage 3, and to provide the outputs of the opcode specific blocks 304 of stage 2 to the control unit 310. The shared functionality blocks 308 and the opcode specific block 304 of stage 3 output results to the multiplexer layer 306(4). The control unit configures the multiplexer layer 306(4) to output results for instruction 4 to the opcode-specific block 304(7) in stage 4. After stage 4, the control unit 310 causes the results for all four instructions of type two to be output in the same cycle. Because the merged data path unit 139 is pipelined, results for a maximum of four instructions of type two can be output per cycle. It is also of course possible for the instruction types to be different in different cycles, so that each cycle, either one instruction of the first type or four instructions of the second type have their results output from the merged data path unit 139.

It should be understood that in any given cycle, any particular stage may be performing operations for instructions of one type while a different stage is performing operations for instructions of a different type. It should be understood that although specific details of the merged data path unit 139, such as number and interconnectivity of functional blocks, are illustrated, many variations in such details are possible and fall within the scope of the present disclosure.

An example implementation of a merged data path unit is now described with respect to ray tracing operations. In general, ray tracing renders an image by casting rays from a camera point through an image plane, determining whether the ray hits an object, and, if so, coloring a pixel in the image plane based on the hit (or miss). The determination of whether a ray hits an object is referred to herein as a "ray intersection test."

The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
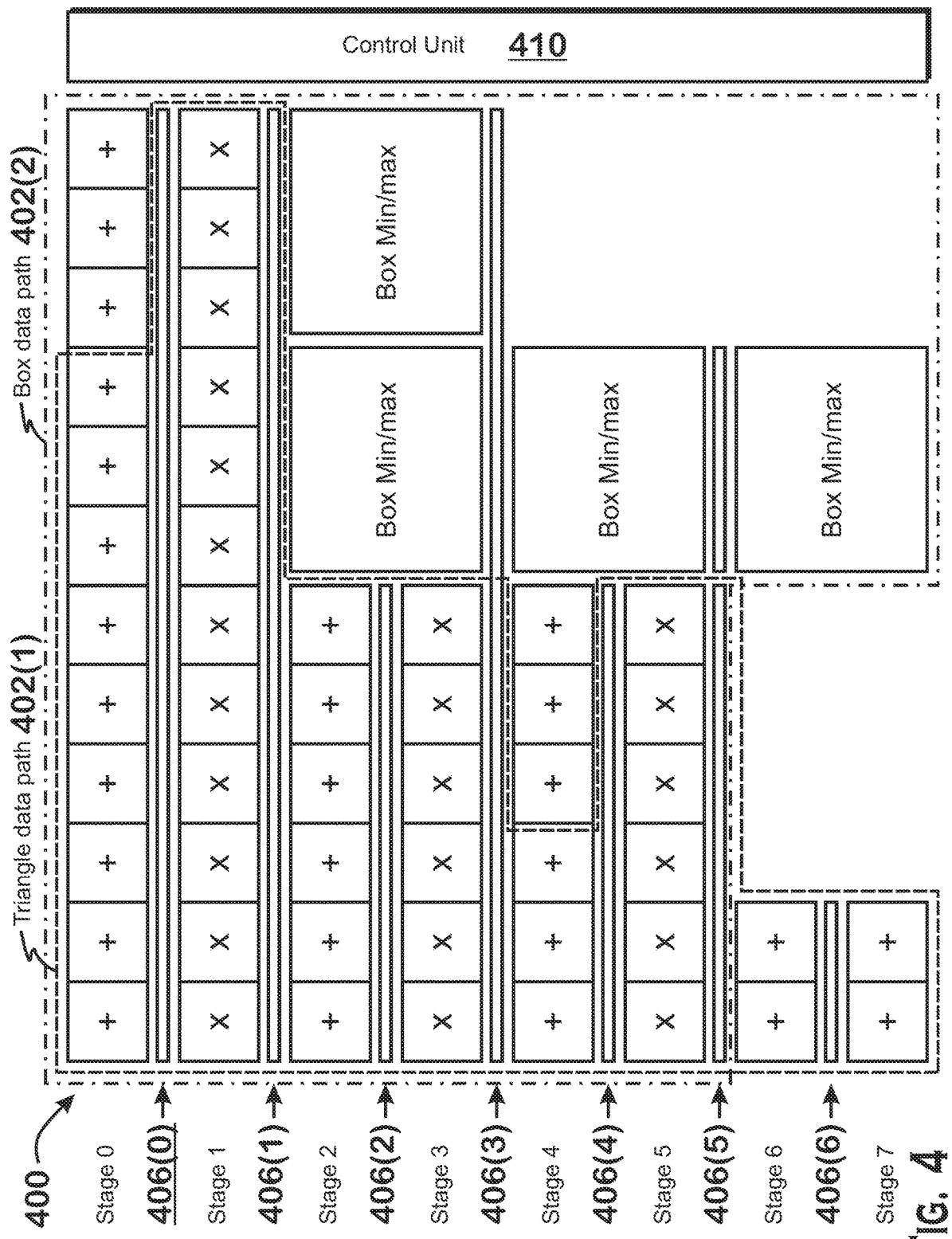
FIG. 4 illustrates an example of a merged data path unit that implements both a ray-box test and a ray-triangle test.

FIG. 4 illustrates an example of a merged data path unit 400 that implements both the ray-box test and the ray-triangle tests. This particular merged data path unit 400 is capable of outputting results for four box tests per cycle or one triangle test per cycle. The merged data path unit 400 both parallelizes and serializes the operations for the box test to achieve this rate for the box test. Each stage is shown having a number of functional blocks. Most of the functional blocks are either adders (indicated with a plus sign "+") that add two scalar values or multipliers (indicated with an "x") that multiply two scalar values. Most of the multipliers and adders are used by both the triangle data path 402(1) and the box data path 402(2). In addition, opcode-specific blocks are shown. These opcode specific blocks include the box min/max units and the triangle compare unit.

The merged data path unit 400 is split into a number of stages, each of which performs specific functions for either or both of the ray-box test and the ray-triangle test. A first stage includes twelve adders. As shown, twelve of these adders are used for two box tests and nine of the adders are used for one triangle test.

When the calculations of stage 0 are complete for the box test or the triangle test, the results are provided to multiplexer layer 406(0). The control unit 410 configures the multiplexer layer 406(0) to provide these results to the multipliers of stage 1 to perform further operations.

At stage 1, twelve multipliers are used for two box tests or for one triangle test. The results are output to multiplexer layer 406(1), which the control unit 410 configures to forward to the subsequent stage according to the instruction being executed. Stages 2 and 3 include six adders and six multipliers, respectively. The six adders and multipliers are used for one box test or one triangle test. Box min/max units are also shown between stages 2 and 3. These units are operation specific units, each used by a single box test. After stage 3, the results for two box tests are complete and are stored in the control unit 410. At stages 2 and 3, for a third box test, the results from the adders and multipliers are provided to the box min/max unit of stages 4 and 5.

Stages 4 and 5 include six adders and six multipliers, respectively. The six adders and multipliers are used for one triangle test or one box test (a fourth box test). Stages 6 and 7 include two adders each, which are used for one triangle test. The box min/max unit is used for the fourth box test. In each cycle, the merged data path unit 400 outputs results for either four box tests (three of which were stored in the control unit 910 and one of which comes from the box min/max unit of stages 6 and 7) or one triangle test (whose results come from stage 7).

Figure 5:
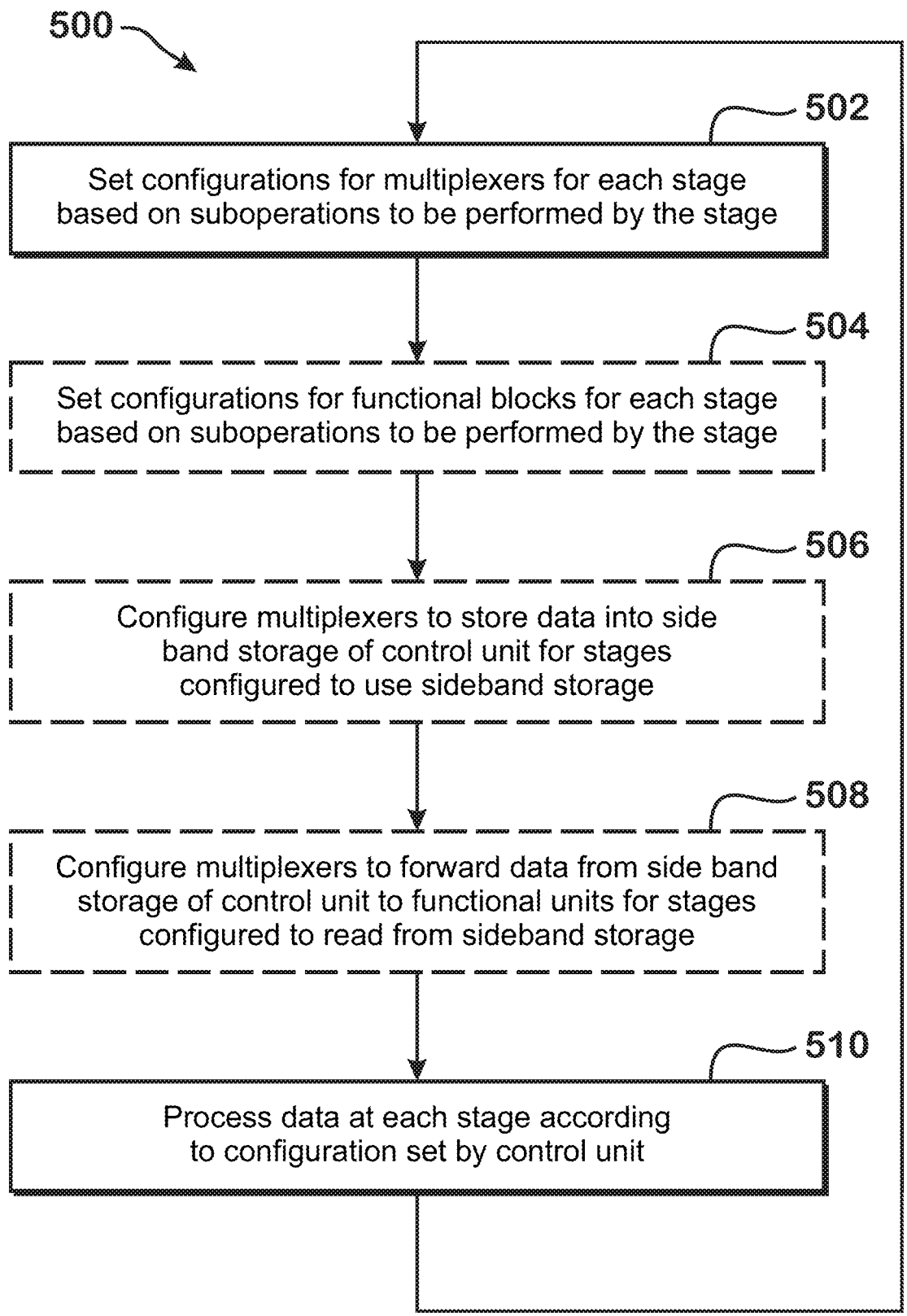
FIG. 5 is a flow diagram of a method for processing data via a merged data path unit, according to an example.

FIG. 5 is a flow diagram of a method 500 for processing data via a merged data path unit 139, according to an example. At step 502, the control unit 310 of the merged data path unit 139 sets configurations for multiplexers for each stage of the merged data path unit 139 based on sub-operations to be performed by that stage. As described elsewhere herein, the merged data path unit 139 is pipelined. This pipelining means that different instructions perform different sub-operations at different stages. The merged data path unit 139 is "merged" in the sense that the different stages are configurable in different ways to perform sub-operations for different types of instructions. The sub-operations for a stage are defined at least by the manner in which data from previous stages (or the input) is fed into the particular functional blocks of the stage. For example, for one instruction type, output from a particular functional block of a previous stage might be fed to a first functional block of a subsequent functional stage while for a different instruction type, output from that particular functional block of the previous stage is fed to a second functional block of the subsequent functional stage. It is also possible to output values from functional blocks to a sideband storage controlled by the control unit 310, and/or to read values into functional blocks from the sideband storage. Whether this occurs, what values are read into or out of the sideband storage, and what functional blocks those values are read to or from, depends on the instruction type. The control unit 310 thus controls the multiplexer layers based on the instruction type to move data between stages.

At step 504, the control unit 310 sets configurations for the functional block for each stage based on sub-operations to be performed by the stage. This step is considered "optional" in that some implementations of the merged data path unit 139 perform this step, while others do not. In implementations that perform this step, at least some of the functional blocks can change the operation that they perform. For example, instead of a functional block being an adder or a multiplier, a functional block may be switched between being an adder and a multiplier. In such implementations, the control unit 310 controls which functional blocks perform which operations based on the instruction type being performed in a particular cycle at that stage.

At step 506, the control unit 310 configures the multiplexers to store data into the side band storage of the control unit 310 for instruction types that use this functionality. Specifically, for some instruction types, some data is stored in the sideband for processing in a stage that is not the immediately subsequent stage from where the data is generated. In an example, this feature is used to facilitate output for multiple instructions per cycle by serializing data processing through the data path. In an example, one instruction is processed in a first two stages and the results for that instruction are then stored in the side band memory. Then data for a second instruction is fetched from the side band memory and provided to the next two stages. At the end, the outputs for both instructions are provided at the same cycle. At step 508, the control unit configures multiplexers to forward data from the side band storage of the control unit 310 to functional units for stages that read from the sideband storage. Steps 506 and 508 are optional because not all implementations of the merged data path 139 use the side band storage feature. At step 510, each stage performs the operations with the data provided by the previous multiplexer layers, and, if the implementation performs step 504 to change the operations performed by the functional blocks, each stage performs the operations as configured by the control unit. After step 510, the method 500 returns back to step 1002 to perform operations for the next cycle. For steps 502-508, the specific manner in which the control unit 310 configures the multiplexor layers and/or functional blocks is based on the instruction type at a particular cycle. At any particular cycle, different stages can be configured to perform instructions for different instruction types. Note that the method can be used to perform the operations described with respect to FIG. 4.

It should be understood that many variations are possible based on the disclosure herein. In an example, any of the stages may be configured to perform different instruction types in the same cycle. In an example, in any particular stage, one functional unit that stage may be configured to process data for a first instruction type in a particular cycle while a different functional unit in that same stage is configured to process data for a second, different instruction type in the same particular cycle. Any stage may be configured to process different instruction types in the same cycle as described above. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A merged data path circuit for performing at least two different types of instructions, the merged data path circuit comprising:
   a plurality of stages including a first stage and a second stage, each stage including one or more functional units, at least one of the functional units being a shared functional unit that performs operations for more than one instruction type of one or more instruction types; and
   a plurality of multiplexors disposed between the stages of the plurality of stages,
   wherein, in a first cycle, a first functional unit of the first stage is configured to execute a first instruction type of a first type;
   wherein in a second cycle that is subsequent to the first cycle, the plurality of stages and the multiplexor are configured to perform operations including:
      executing the first instruction in a first functional unit of the second stage, the executing including selecting, via the plurality of multiplexors, as input for the first functional unit of the second stage, data from the first functional unit of the first stage generated in the first cycle, and
      executing a second instruction of a second instruction type in a second functional unit of the first stage; and
   wherein in a third cycle, that is subsequent the second cycle, the plurality of stages and the multiplexor are configured to perform operations including:
      executing the second instruction in the first functional unit of the second stage, the executing including selecting, by the plurality of multiplexors, as input for the first functional unit of the second stage, data from the second functional unit of the first stage generated in the second cycle.

2. The merged data path circuit of claim 1, wherein the one or more functional units comprise at least one opcode-specific block used by one instruction type of the at least two different types of instructions but not another instruction type of the at least two different types of instructions.

3. The merged data path circuit of claim 1, wherein at least one stage of the plurality of stages is configured to process multiple instances of an instruction type of the one or more instruction types in parallel in a single cycle.

4. The merged data path circuit of claim 1, wherein the plurality of stages is configured to perform multiple instances of an instruction type of the one or more instruction types by serializing operations for the multiple instances through the plurality of stages.

5. The merged data path circuit of claim 1, further comprising a control unit configured to configure the plurality of multiplexors to route the data for the different functional units of the plurality of stages based on the instruction type executed at the stages.

6. The merged data path circuit of claim 5, wherein the control unit is further configured to store data from at least one stage for use in a subsequent stage.

7. The merged data path circuit of claim 1, wherein at least one functional unit of the one or more functional units comprises a functional unit that spans multiple stages.

8. The merged data path circuit of claim 1 wherein at least one of the one or more functional units receives inputs from input clocked elements and outputs values to output clocked elements and has no clocked elements between the input clocked elements and output clocked elements.

9. The merged data path circuit of claim 1, wherein the two different types of instructions comprise a ray-triangle intersection test and ray-box intersection test.

10. A method for operating a merged data path circuit for performing at least two different types of instructions, the merged data path circuit including a plurality of stages including a first stage and a second stage, each stage including one or more functional units, at least one of the functional units being a shared functional unit that performs operations for more than one instruction type, and a plurality of multiplexors disposed between the stages of the plurality of stages, the method comprising:
   configuring the plurality of stages to perform instructions of one or more instruction types by controlling the plurality of multiplexors to route data between functional units of the plurality of stages based on the instruction type executed at the stages; and
   configuring the plurality of stages such that in at least one cycle, a first stage of the plurality of stages is configured for a first instruction type and a second stage of the plurality of stages is configured for a second instruction type,
   in a first cycle, configuring a first functional unit of the first stage to execute a first instruction of a first type;
   in a second cycle that is subsequent to the first cycle, performing operations including:
      executing the first instruction in a first functional unit of the second stage, the executing including selecting, via the plurality of multiplexors, as input for the first functional unit of the second stage, data from the first functional unit of the first stage generated in the first cycle, and
      executing a second instruction of a second instruction type in a second functional unit of the first stage; and
   in a third cycle that is subsequent to the second cycle, performing operations including:
      executing the second instruction in the first functional unit of the second stage, the executing including selecting, by the plurality of multiplexors, as input for the first functional unit of the second stage, data from the second functional unit of the first stage generated in the second cycle.

11. The method of claim 10, wherein the one or more functional units comprise at least one opcode-specific block used by one instruction type of the at least two different types of instructions but not another instruction type of the at least two different types of instructions.

12. The method of claim 10, further comprising:
   processing, by at least one stage of the plurality of stages, multiple instances of an instruction type of the one or more instruction types in parallel in a single cycle.

13. The method of claim 10, further comprising:
   performing, by the plurality of stages, multiple instances of an instruction type of the one or more instruction types by serializing operations for the multiple instances through the plurality of stages.

14. The method of claim 10, further comprising:
  storing data from at least one stage for use in a subsequent stage by a control unit.

15. The method of claim 10, wherein at least one functional unit of the one or more functional units comprises a functional unit that spans multiple stages.

16. The method of claim 10, further comprising:
  receiving, by at least one of the one or more functional units, inputs from input clocked elements; and
  outputting, by the at least one of the one or more functional units, values to output clocked elements.

17. The method of claim 10, further comprising:
  outputting data, by the plurality of stages, to a single instruction multiple data unit for graphics processing.

18. The method of claim 10, wherein the two different types of instructions comprise a ray-triangle intersection test and ray-box intersection test.

19. An accelerated processing device comprising:
  a processing unit; and
  a merged data path circuit for performing at least two different types of instructions at the request of the processing unit, the merged data path circuit comprising:
    a plurality of stages including a first stage and a second stage, each stage including one or more functional units, at least one of the functional units being a shared functional unit that performs operations for more than one instruction type; and
    a plurality of multiplexors disposed between the stages of the plurality of stages,
    wherein, in a first cycle, a first functional unit of the first stage is configured to execute a first instruction type of a first type;
    wherein in a second cycle that is subsequent to the first cycle, the plurality of stages and the multiplexor are configured to perform operations including:
      executing the first instruction in a first functional unit of the second stage, the executing including selecting, via the plurality of multiplexors, as input for the first functional unit of the second stage, data from the first functional unit of the first stage generated in the first cycle, and
      executing a second instruction of a second instruction type in a second functional unit of the first stage; and
    wherein in a third cycle, that is subsequent the second cycle, the plurality of stages and the multiplexor are configured to perform operations including:
      executing the second instruction in the first functional unit of the second stage, the executing including selecting, by the plurality of multiplexors, as input for the first functional unit of the second stage, data from the second functional unit of the first stage generated in the second cycle.

20. The accelerated processing device of claim 19, wherein the one or more functional units comprise at least one opcode-specific block used by one instruction type of the at least two different types of instructions but not another instruction type of the at least two different types of instructions.

* * * * *